United States Patent
Staires et al.

(10) Patent No.: US 11,931,612 B2
(45) Date of Patent: Mar. 19, 2024

(54) METHOD AND APPARATUS FOR LAUNCHING AND RECOVERING A REMOTE INSPECTION DEVICE FROM A VOLATILE FLUID STORAGE TANK

(71) Applicant: PHILLIPS 66 COMPANY, Houston, TX (US)

(72) Inventors: Troy L. Staires, Katy, TX (US); Benjamin C. Moore, Houston, TX (US); Jerome Vaganay, Norwell, MA (US); Eric Levitt, Camden, ME (US); William O'Halloran, Boston, MA (US)

(73) Assignee: PHILLIPS 66 COMPANY, Houston, TX (US)

( * ) Notice: Subject to any disclaimer, the term of this patent is extended or adjusted under 35 U.S.C. 154(b) by 0 days.

(21) Appl. No.: 18/090,178

(22) Filed: Dec. 28, 2022

(65) Prior Publication Data

US 2023/0138010 A1     May 4, 2023

Related U.S. Application Data

(62) Division of application No. 16/539,697, filed on Aug. 13, 2019.

(Continued)

(51) Int. Cl.
*A62C 3/06*     (2006.01)
*A62C 99/00*    (2010.01)
(Continued)

(52) U.S. Cl.
CPC .......... *A62C 3/065* (2013.01); *A62C 99/0036* (2013.01); *B08B 3/02* (2013.01);
(Continued)

(58) Field of Classification Search
CPC ....... A62C 3/065; A62C 99/0036; B08B 3/02; B08B 9/027; B25H 1/14; B25H 3/00;
(Continued)

(56) References Cited

U.S. PATENT DOCUMENTS 5,037,486 A * 8/1991 Sloan .................... B08B 9/0933
                                                134/22.12
5,138,891 A * 8/1992 Johnson ................... G01N 1/12
                                                73/306

(Continued)

FOREIGN PATENT DOCUMENTS

CN      102091706 B  * 4/2014  ............... B08B 9/08
CN      105215029 A  * 1/2016  ........... B08B 9/0936
(Continued)

OTHER PUBLICATIONS

Schempf et al, Distribution Gasline Robotics and Automation focusing on Explorer: Long-Range Untethered Real-Time Live Gas Main Robotic Inspection System, Version Final Report (Year: 2005).*

(Continued)

*Primary Examiner* — David L Singer
(74) *Attorney, Agent, or Firm* — Patterson + Sheridan, LLP

(57) ABSTRACT

Methods and apparatus for launch and recovery of a remote inspection device within a fluid storage tank. In one embodiment, the tank is accessed by opening an entrance hatch and then injecting a vapor suppression foam across a surface of a stored liquid mass to form a foam layer. A launching system having a remote inspection device is attached to the entrance hatch to define a launch and recovery space sealed from an external environment and isolated from the stored liquid mass in the tank via a valve and the foam layer. The launch and recovery space is purged of hazardous vapors by injection of an inert gas prior to launch and recovery of the (Continued)

remote inspection device. Prior to removal of the launching system, the surface of the stored liquid mass is re-coated with vapor suppression foam.

20 Claims, 12 Drawing Sheets

Related U.S. Application Data

(60) Provisional application No. 62/718,145, filed on Aug. 13, 2018.

(51) Int. Cl.

| | | |
|---|---|---|
| *B08B 3/02* | (2006.01) | |
| *B08B 9/027* | (2006.01) | |
| *B63C 3/06* | (2006.01) | |
| *B65D 90/44* | (2006.01) | |
| *B65D 90/48* | (2006.01) | |
| *B66F 11/04* | (2006.01) | |
| *B66F 19/00* | (2006.01) | |
| *G01N 35/00* | (2006.01) | |
| *B25H 1/14* | (2006.01) | |
| *B25H 3/00* | (2006.01) | |
| *B65H 75/36* | (2006.01) | |
| *E04G 3/30* | (2006.01) | |
| *G01N 21/90* | (2006.01) | |
| *G01N 21/954* | (2006.01) | |
| *G01N 29/26* | (2006.01) | |
| *G01N 29/265* | (2006.01) | |

(52) U.S. Cl.
CPC .............. *B08B 9/027* (2013.01); *B63C 3/06* (2013.01); *B65D 90/44* (2013.01); *B65D 90/48* (2013.01); *B66F 11/04* (2013.01); *B66F 19/00* (2013.01); *G01N 35/0099* (2013.01); *B25H 1/14* (2013.01); *B25H 3/00* (2013.01); *B65H 75/368* (2013.01); *B65H 2403/544* (2013.01); *E04G 3/30* (2013.01); *G01N 21/909* (2013.01); *G01N 2021/9548* (2013.01); *G01N 29/262* (2013.01); *G01N 29/265* (2013.01); *G01N 2201/0218* (2013.01); *G01N 2291/0234* (2013.01); *G01N 2291/0258* (2013.01); *G01N 2291/2636* (2013.01); *G01N 2291/2695* (2013.01)

(58) Field of Classification Search
CPC .......... B63C 3/06; B65D 90/44; B65D 90/48; B65H 75/368; B66F 11/04; B66F 19/00; E04G 3/30; G01N 2021/9548; G01N 21/909; G01N 2201/0218; G01N 2291/0234; G01N 2291/0258; G01N 2291/2636; G01N 2291/2695; G01N 29/262; G01N 29/265
See application file for complete search history.

(56) References Cited

U.S. PATENT DOCUMENTS

| | | | | |
|---|---|---|---|---|
| 5,363,935 A * | 11/1994 | Schempf | .............. | B62D 55/265 901/44 |
| 5,435,405 A * | 7/1995 | Schempf | .............. | B62D 55/265 901/44 |
| 5,451,135 A * | 9/1995 | Schempf | .............. | B08B 9/0933 280/42 |
| 5,640,982 A * | 6/1997 | Landry | .................. | B08B 9/093 134/167 R |
| 5,819,863 A * | 10/1998 | Zollinger | .............. | B62D 63/02 73/866.5 |
| 5,942,687 A * | 8/1999 | Simmonds | ............. | G01B 17/02 73/579 |
| 6,104,970 A * | 8/2000 | Schmidt, Jr. | ........... | B62D 55/32 73/1.22 |
| 7,017,432 B2 * | 3/2006 | Silverman | .............. | F16L 11/22 73/865.8 |
| 7,467,560 B2 * | 12/2008 | Silverman | ........... | G01N 29/341 73/865.8 |
| 8,122,780 B1 * | 2/2012 | Zollinger | .............. | B65D 90/00 73/866.5 |
| 9,540,907 B1 * | 1/2017 | du Plessis | ................ | A62C 3/06 |
| 2004/0016755 A1 * | 1/2004 | Gilbert | .................. | B65D 88/34 220/826 |
| 2004/0036859 A1 * | 2/2004 | Silverman | ........... | G01N 21/954 356/237.1 |
| 2004/0045379 A1 * | 3/2004 | Silverman | ................ | D04C 1/02 73/865.8 |
| 2004/0134518 A1 * | 7/2004 | Kraus | ....................... | B08B 5/04 15/302 |
| 2005/0087362 A1 * | 4/2005 | Silverman | .............. | F16L 11/22 174/135 |
| 2006/0054189 A1 * | 3/2006 | Luke | ........................ | B08B 9/08 134/169 R |
| 2006/0054202 A1 * | 3/2006 | Luke | ........................ | B08B 9/08 134/169 R |
| 2008/0148876 A1 * | 6/2008 | Hock | .................... | G01N 29/225 73/865.8 |
| 2009/0133515 A1 * | 5/2009 | Gershtein | .............. | B08B 9/049 73/866 |
| 2010/0180672 A1 * | 7/2010 | Zollinger | ........... | G01N 35/0099 901/1 |
| 2010/0294761 A1 * | 11/2010 | Riordan | ................. | B65D 90/38 220/88.1 |
| 2012/0125128 A1 * | 5/2012 | Gershtein | ............. | B05B 12/122 73/864 |
| 2013/0020319 A1 * | 1/2013 | Riordan | ................. | B65D 90/38 220/88.1 |
| 2016/0101304 A1 * | 4/2016 | Langenbeck | ........... | A62C 3/065 169/45 |
| 2018/0088592 A1 * | 3/2018 | Gildner | ..................... | B64B 1/70 |
| 2019/0201947 A1 * | 7/2019 | Jansen | .................. | B01J 8/0015 |
| 2019/0287688 A1 * | 9/2019 | Cole | ...................... | G01N 9/10 |
| 2019/0325668 A1 * | 10/2019 | Cole | .................... | G05D 1/0692 |
| 2020/0363804 A1 * | 11/2020 | Meyers | ................ | G01N 29/262 |
| 2021/0018396 A1 * | 1/2021 | Meyers | ............... | G01M 5/0033 |
| 2021/0089033 A1 * | 3/2021 | Meyers | ............... | G01M 5/0075 |
| 2021/0116419 A1 * | 4/2021 | Meyers | ................ | G05D 1/0094 |

FOREIGN PATENT DOCUMENTS

| | | | | |
|---|---|---|---|---|
| CN | 107607465 A | * | 1/2018 | ............. G01N 17/00 |
| EP | 0736722 A1 | * | 10/1996 | ............. G02B 6/52 |
| GB | 2196715 A | * | 5/1988 | ............. B08B 9/055 |
| NO | 334827 B1 | * | 6/2014 | ............. F16L 55/46 |
| WO | WO-2018104790 A1 | * | 6/2018 | ................ B25J 1/00 |

OTHER PUBLICATIONS

Schempf, Neptune: Above-Ground Storage Tank Inspection Robot System, IEEE (Year: 1994).*

* cited by examiner

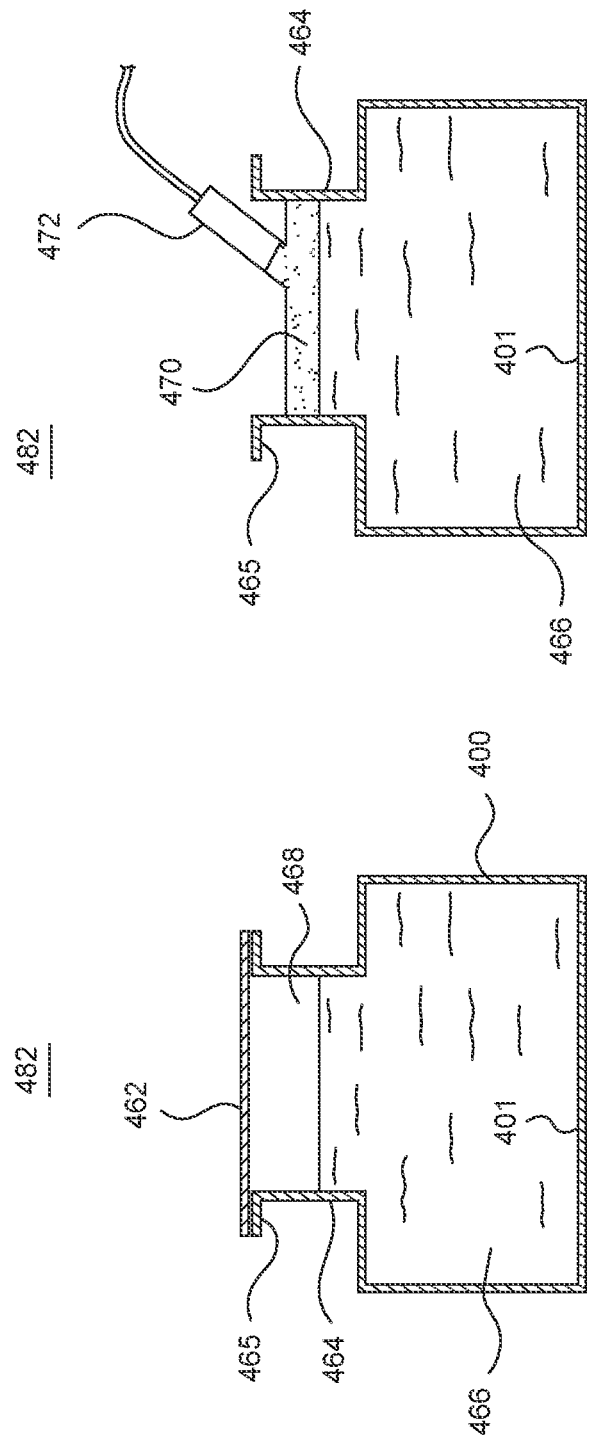

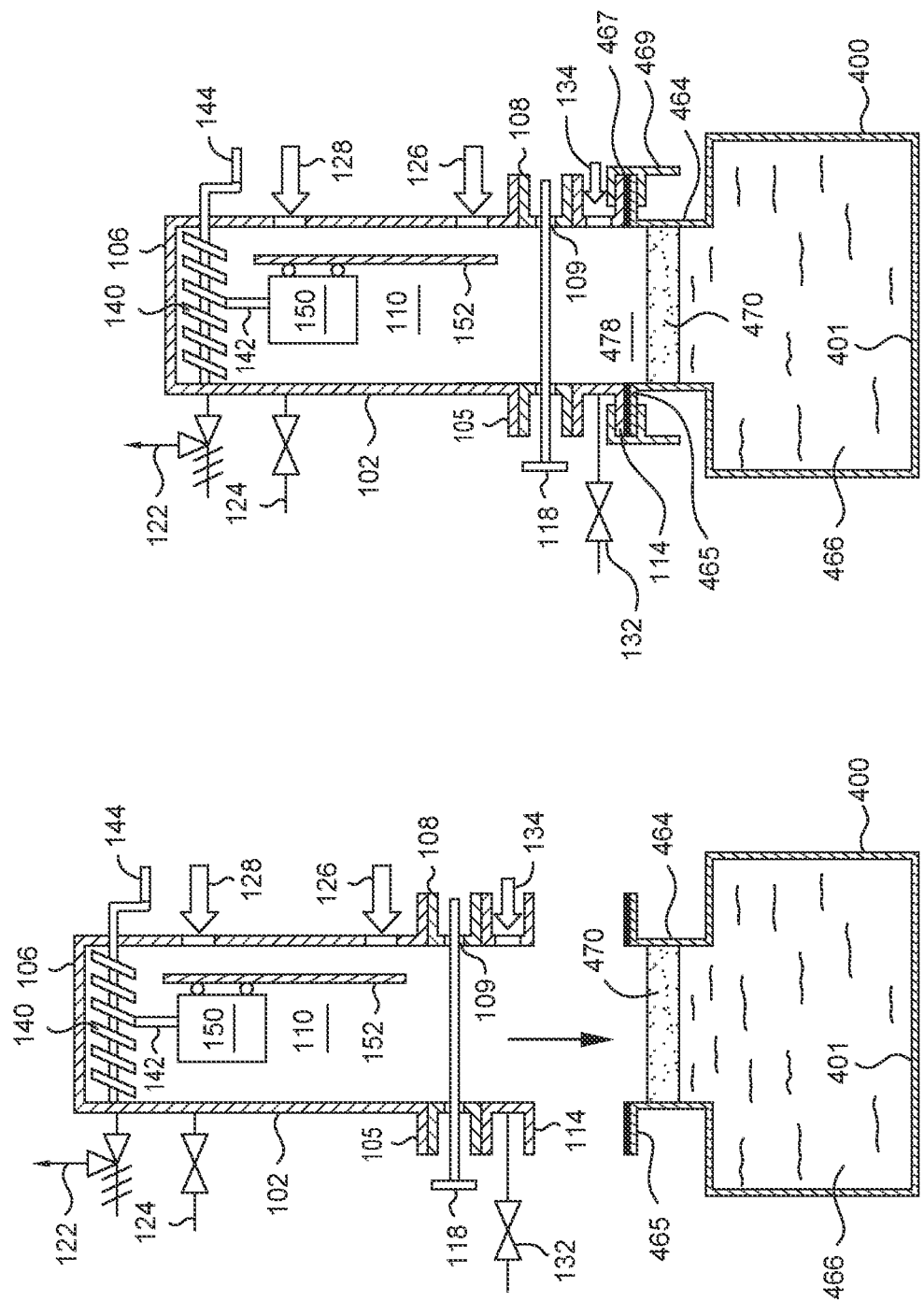

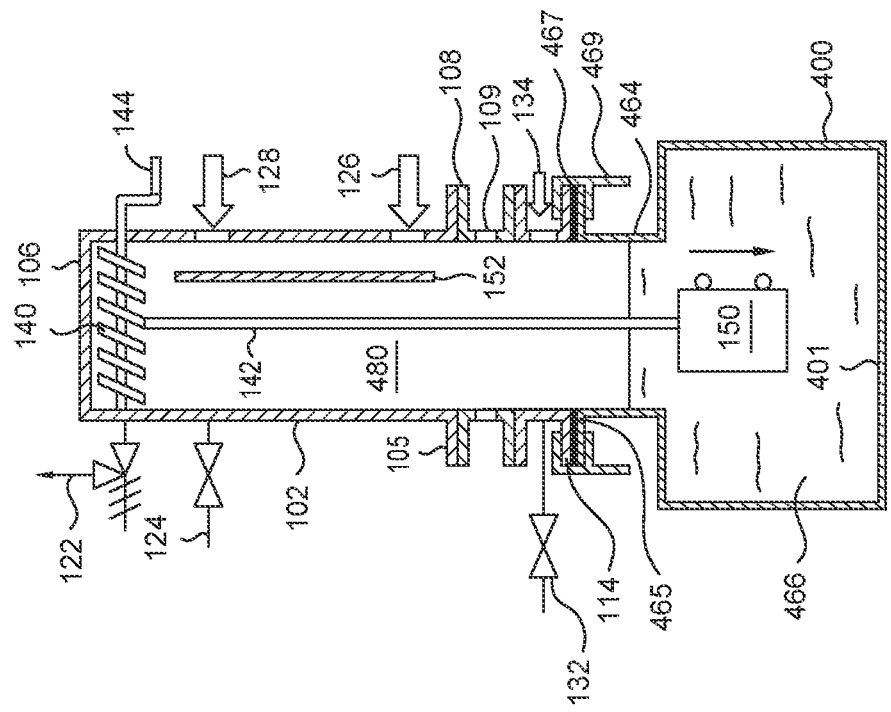
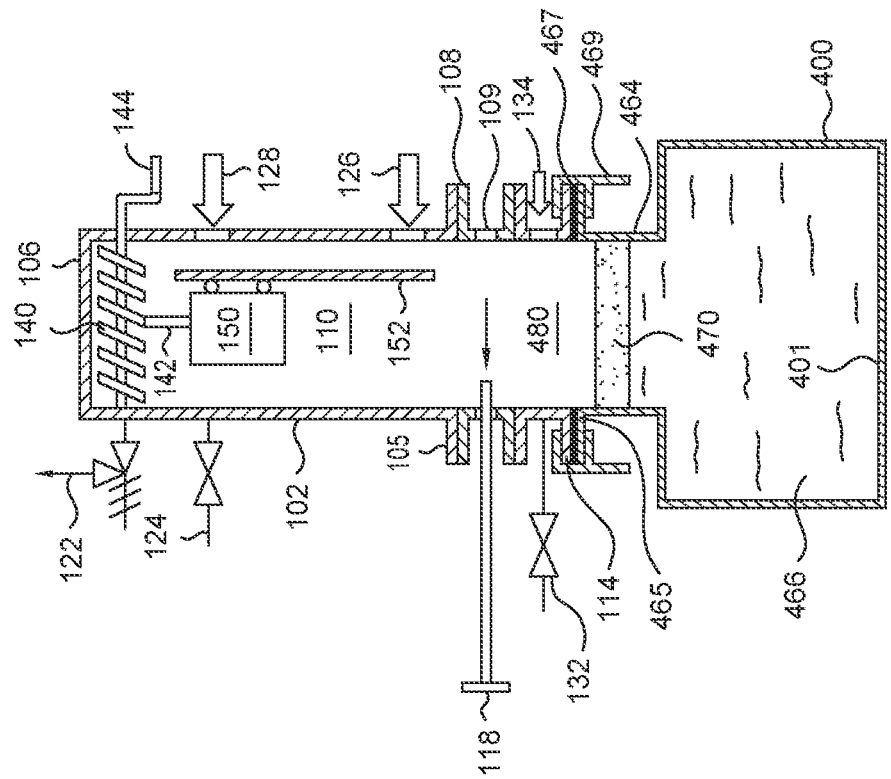

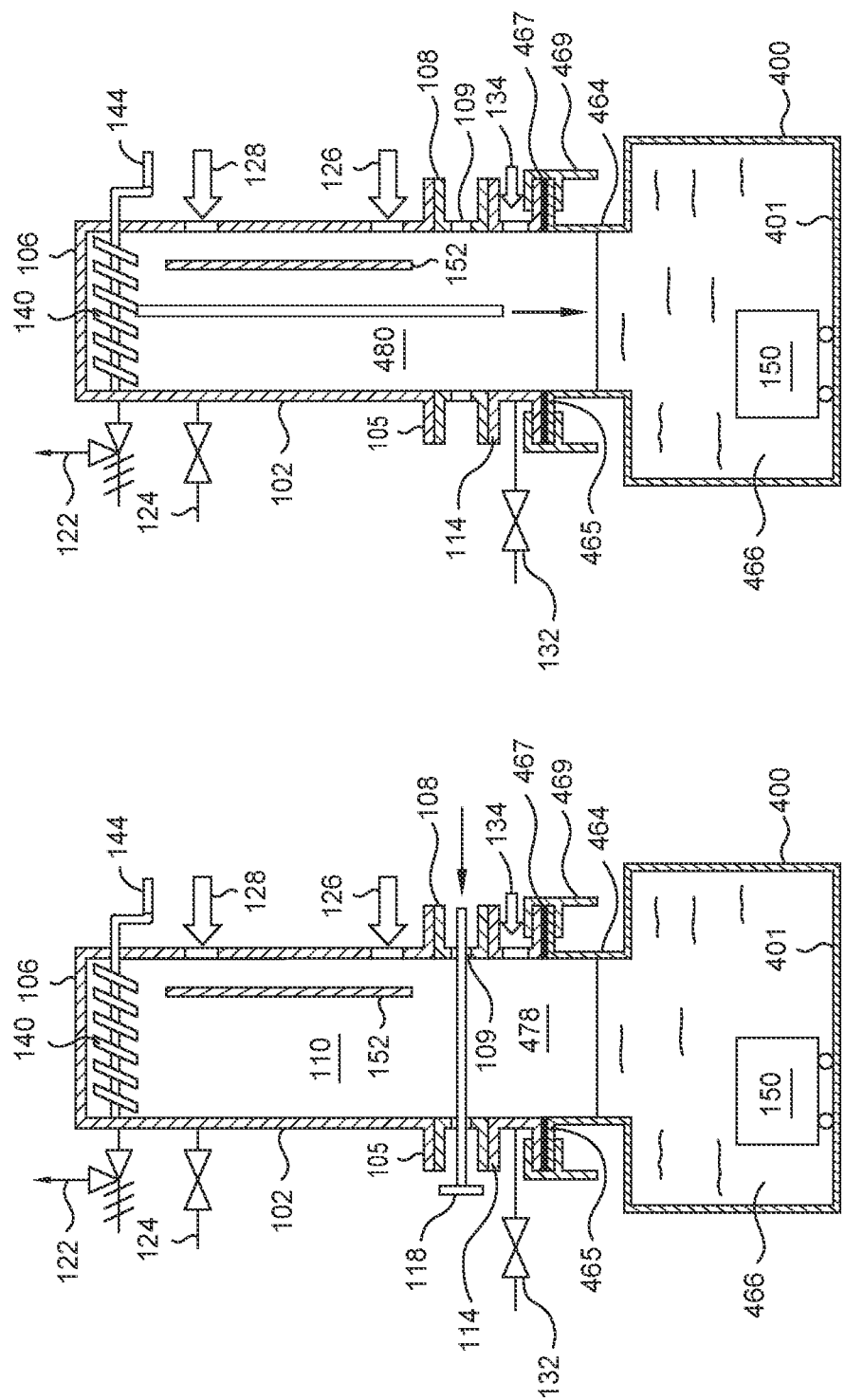

METHOD AND APPARATUS FOR LAUNCHING AND RECOVERING A REMOTE INSPECTION DEVICE FROM A VOLATILE FLUID STORAGE TANK

CROSS-REFERENCE TO RELATED APPLICATIONS

This application is a divisional of U.S. patent application Ser. No. 16/539,697 filed Aug. 13, 2019, which claims priority from U.S. Provisional Application Ser. No. 62/718,145, filed Aug. 13, 2018, each of which is hereby incorporated by reference in its entirety.

BACKGROUND

Field

Embodiments of the present disclosure generally relate to methods and apparatus for inspection of liquid storage vessels, and more particularly, inspection of hydrocarbon storage tanks.

Description of the Related Art

Hydrocarbon-based fluids, such as crude oil and gasoline, are often stored in large hydrocarbon storage tanks built above ground. These storage tanks are typically cylindrical in shape and formed of steel. As a preventive measure against corrosion and the escape of stored product into the surrounding environment, the storage tanks are coated and connected to a sacrificial metal structure for cathodic protection. Despite these preventative measures, the storage tanks still remain vulnerable to the salts, acids, and other corrosive materials found in the crude oil and refined hydrocarbon-based products they are meant to hold. Thus, routine and periodic inspections of the interiors of the storage tanks are necessary to determine the integrity of such structures.

Though necessary, inspections of the storage tanks require a significant amount of time and effort in order to perform the inspections safely and thoroughly. Conventional inspections typically require taking the storage tank out of service, draining all the stored hydrocarbon products from the tank, and deploying a human inspector into the tank to conduct the inspection while additional support personnel and equipment are stationed nearby. Efforts have recently been made to utilize remote inspection devices to allow inspection of the storage tanks without draining the stored hydrocarbon products and deploying personnel therein. However, deployment of remote inspection devices remains problematic due to a lack of containment of hazardous vapors that are continuously volatilized from the stored hydrocarbon products. Current remote inspection systems either do not provide proper containment of the hazardous vapors during inspection, or utilize a tethering system for the remote inspection devices that causes sealing issues and potential contamination of the manway and its surroundings.

Accordingly, what is needed in the art are improved methods and apparatus for inspection of liquid storage vessels.

SUMMARY

The present disclosure generally relates to methods and apparatus for inspection of liquid storage vessels. In one embodiment, an apparatus for inspection of a liquid storage vessel is provided. The apparatus includes a chamber body having an internal volume partially defined by one or more sidewalls and a lid and a closure coupled to the chamber body opposite of the lid and further defining the internal volume. The apparatus further includes a gas injection port is disposed through the chamber body for delivering an inert gas into the internal volume and a lifting system within the internal volume for transporting an inspection device through the closure.

In one embodiment, a method for deploying an inspection device into a hazardous environment containing a mass of vaporizable liquid is provided. The method includes providing a launching system having a closed vessel with an inspection device disposed therein, forming a vapor suppression layer on the liquid mass at an access passage of a storage tank, and attaching the closed vessel of the launching system to the access passage. The method further includes inerting an internal volume of the closed vessel of the launching system, opening the closed vessel to the access passage, and passing the inspection device from the launching system into the liquid mass.

In one embodiment, a method inspecting a storage vessel is provided. The method includes injecting a vapor suppression foam into an opening of the storage vessel to form a vapor suppression layer over a liquid mass therein and coupling a launching system having an inspection device to the opening. A volume between the launching system and the vapor suppression layer is inerted by injecting one or more inert gases into the volume. A closure of the launching system is opened, and a cable removably coupled to the inspection device is unwound to lower the inspection device into the liquid mass. When the inspection device is in the storage vessel, the inspection device is uncoupled from the cable.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

FIGS. 4A-4H are schematic cross-sectional views of the launching system at different stages of a remote inspection device launching process according to an embodiment described herein.

FIGS. 6A-6H are schematic cross-sectional views of the launching system at different stages of a remote inspection device recovery process according to an embodiment described herein.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure relates to methods and apparatus for launch and recovery of a remote inspection device within a liquid storage tank. In one embodiment, the tank is accessed by opening an entrance hatch and then injecting a vapor suppression foam across a surface of a stored liquid mass to form a foam layer. A launching system having a remote inspection device is attached to the entrance hatch to define a launch and recovery space sealed from an external environment and isolated from the stored liquid mass in the tank via a valve and the foam layer. The launch and recovery space is purged of hazardous vapors by injection of an inert gas prior to launch and recovery of the remote inspection device. Prior to removal of the launching system, the surface of the stored liquid mass is re-coated with vapor suppression foam.

Figure 1:
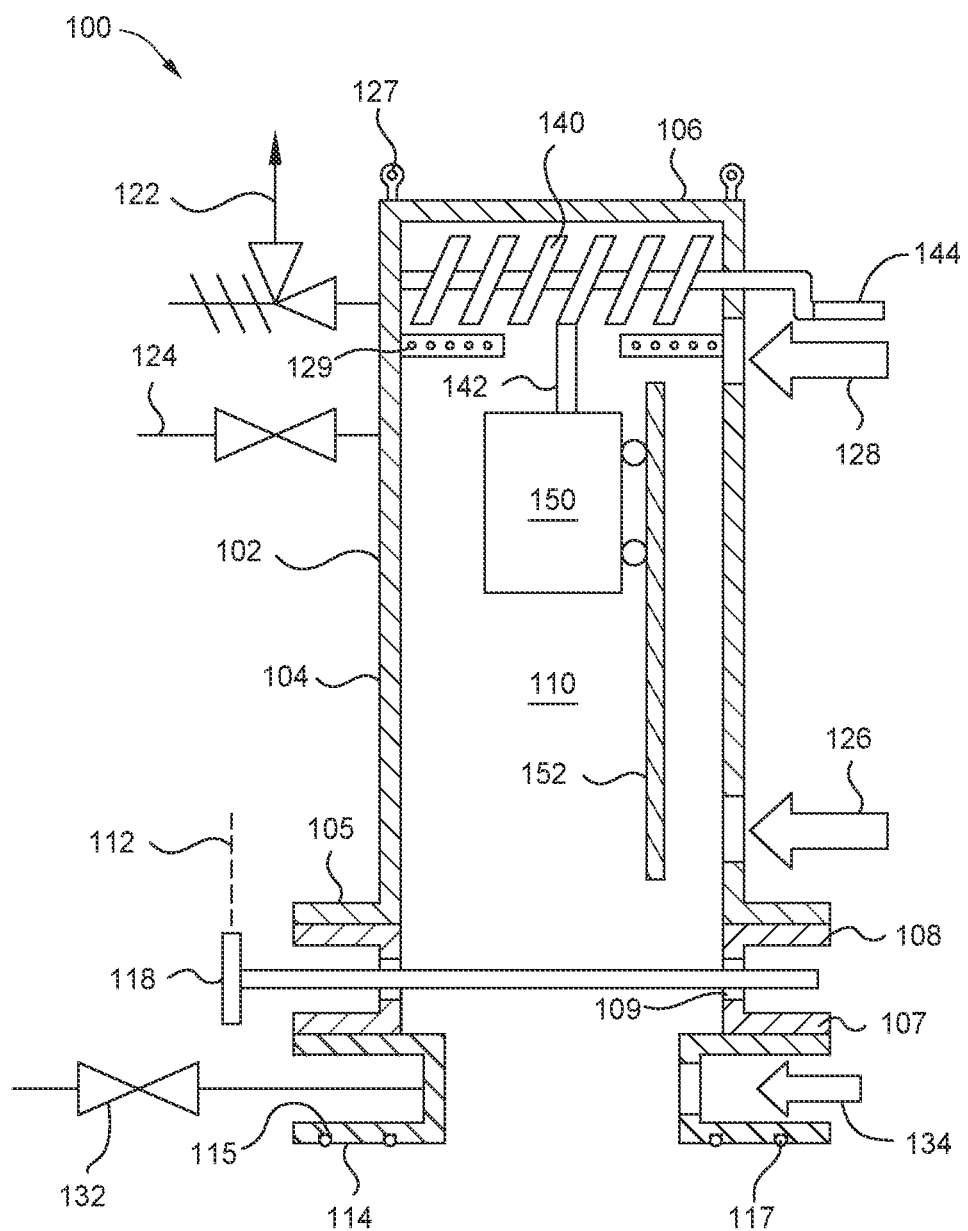
FIG. 1 is a cross-sectional view of a launching system for a remote inspection device according to an embodiment described herein.

FIG. 1 is a cross-sectional view of a launching system 100 for a remote inspection device 150 according to one embodiment. The launching system 100 includes a chamber body 102 having one or more sidewalls 104 and a lid 106 at least partially defining a launch and recovery volume 110. In one embodiment, the lid 106 is integrally coupled to the sidewalls 104. In one embodiment, the lid 106 is removably coupled to the sidewalls 104. The chamber body 102 may have any suitable morphology and dimensions. In one embodiment, the chamber body 102 has a substantially cylindrical shape. In another embodiment, the chamber body 102 has a polygonal shape, such as a rectangular shape or the like. In some embodiments, the chamber body 102 is shaped to correspond with a morphology of an opening or manway in a liquid storage tank. The chamber body 102 is fabricated from a material suitable for maintaining a low pressure and inerted environment therein, such as metallic materials, for example aluminum and titanium. In another aspect, the chamber body 102 is fabricated from a metal alloy, for example stainless steel, carbon steel, hastelloy, and nickel alloy. Furthermore, the chamber body 102 and any equipment or components coupled thereto are electrically bonded to match the electric potentials thereof. For example, the chamber body 102 and the equipment or components coupled thereto may be electrically bonded via one or more bonding straps, bus bars, jumper wires, shunts, rods, adhesives, and other suitable electrical connectors.

The chamber body 102 further contains a winch 140, a cable 142, and a remote inspection device 150 therein. The winch 140 may be coupled to the chamber body 102 at any suitable location, such as for example, to the lid 106 or a distal end of the sidewalls 104 as depicted in FIG. 1A. In one embodiment, the winch 140 is a manual hand winch having a handle 144 disposed external to the launch and recovery volume 110 for manual hand crank operation. In another embodiment, the winch 140 is a pneumatic winch to which compressed air may be fed in a location external to the launch and recovery volume 110. In yet another embodiment, the winch 140 is a hydraulic winch. Rotation of the winch 140 enables winding and unwinding of the cable 142, to which the remote inspection device 150 is removably coupled at a distal end thereof. Thus, the remote inspection device 150 may be raised and lowered through the chamber body 102 by rotation of the winch 140 when the launching system is in an upright position. In one embodiment, the cable 142 is fabricated from a material suitable to withstand a high tension generated by the weight of the remote inspection device 150 when coupled thereto, such as a load capacity between about 200 pounds and about 500 pounds. For example, the cable 142 is fabricated from a metallic material such as aluminum, titanium, or a metal alloy. In some examples, the cable 142 is fabricated from the same metallic material as the chamber body 102.

The remote inspection device 150 includes any suitable submersible apparatus for inspection of liquid-containing vessels. For example, the remote inspection device 150 is a submersible vehicle configured to perform tethered or tetherless inspection of liquid-containing vessels. In one embodiment, the remote inspection device 150 is controlled by a user at a remote location. Additionally or alternatively, the remote inspection device 150 may have autonomous functionality. Generally, the remote inspection device 150 includes a chassis, a locomotion or propulsion system, a power source, and one or more sensors for performing inspection of liquid-containing vessels. Examples of sensors that may be integrated with the remote inspection device 150 to aid in inspection include an optical sensor, a magnetic field sensor, a phased-array ultrasonic testing system, a gyrocompass, an inertial navigation system, a speed sensor, an acoustic ranging system, and an acoustic or Doppler sensor. In one embodiment, the remote inspection device 150 includes a nose cone (not shown) having a substantially conical shape for centering the remote inspection device 150 upon entry into the launching system 100 during recovery thereof. For example, the nose cone may be utilized to guide and stabilize the remote inspection device 150 while the remote inspection device 150 is raised through a lower opening of the launching system 100.

In one embodiment, one or more sets of device guides 152 are optionally disposed within the launch and recovery volume 110 upon which the remote inspection device 150 may be raised and lowered. In combination with the nose cone, the one or more sets of device guides 152 are utilized to position and usher the remote inspection device 150 during launch and recovery and prevent swinging thereof. For example, the one or more sets of device guides 152 may prevent collision of the remote inspection device 150 with the sidewall 104 while the remote inspection device 150 is being raised, lowered, or stored within the chamber body 102. In one embodiment, the one or more sets of device guides 152 are rails, tracks, or slots disposed through the launch and recovery volume 110.

A pressure relief port 122, a test port 124, an inert gas injection port 126, and an optional wash port 128 are disposed through the one or more sidewalls 104 and/or the lid 106. For example, the pressure relief port 122, the test port 124, the inert gas injection port 126, and the wash port 128 may be disposed at a distal end of the sidewalls 104. In one embodiment, the pressure relief port 122 includes a y-type valve, a k-type valve, a spring-loaded valve, or any other suitable type of automatic control valve. The pressure relief port 122 functions as a fail-safe to automatically release gases from the launch and recovery volume 110 when an internal pressure exceeds a desired or preset limit. The test port 124 provides a coupling for diagnostic equipment (not shown) to monitor one or more conditions of the launch and recovery volume 110. In one embodiment, the test port 124 may serve as an adaptor for a pressure gauge, a temperature gauge, or the like. The gas injection port 126 facilitates the delivery of one or more gases into the launch and recovery volume 110, for example, during the launch and recovery of the remote inspection device 150. In one embodiment, the inert gas injection port 126 is coupled to a gas supply (not shown) configured to supply one or more inert gases into the launch and recovery volume 110, such as nitrogen, argon, and the like. Altogether, the pressure relief port 122, the test port 124, and the gas injection port 126 are utilized to inert the launch and recovery volume 110 and maintain a slight overpressure of inert gas above ambient atmospheric pressure therein during launch and recovery of the remote inspection device 150. In one embodiment, the pressure relief port 122, the test port 124, and the gas injection port 126 are disposed in close proximity to one another for easier accessibility to a user.

In some embodiments, the launching system 100 may include the optional wash port 128. The wash port 128 facilitates the delivery of one or more cleaning fluids into the launch and recovery volume 110. For example, the wash port 128 may be coupled to a cleaning fluid supply (not shown) configured to supply one or more cleaning fluids to the launch and recovery volume 110 to clean the remote inspection device 150, cable 142, and interior walls of the chamber body 102. Suitable cleaning fluids for use with the launching system 100 include non-corrosive or biodegradable agents. In one embodiment, the wash port 128 is further coupled to an annular spray device 129, such as a showerhead, disposed between the winch 140 and the remote inspection device 150 and around the cable 142. For example, the spray device 129 may be coupled to the chamber sidewalls 104 or the lid 106. The spray device 129 is utilized to direct and distribute the cleaning fluids within the interior of the chamber body 102, such as against the cable 142, the remote inspection device 150, and the interior walls of the chamber body 102.

One or more lifting lugs 127 are coupled to an exterior surface of the chamber body 102, such as the sidewalls 104 or the lid 106. Two lifting lugs 127 are shown coupled to the lid 106 in FIG. 1A. The lifting lugs 127 provide anchor points for one or more cables of a lifting device (not shown) to attach thereto and hoist the launching system 100 onto or off of the liquid storage tank. For example, the launching system 100 may be lifted onto a roof of the storage tank via a crane or other suitable device having a hoisting cable attached to the lifting lugs 127. In one embodiment, the lifting lugs 127 are formed of a material similar to that of the chamber body 102, such as aluminum, titanium, or a metal alloy.

A closure 108 is coupled to the chamber body 102 at a flange 105 and further defines the launch and recovery volume 110. The closure 108 enables opening and closing of the launch and recovery volume 110 to an external environment, such as the interior of the liquid storage tank. In some embodiments, the closure 108 is a ball valve, a plug valve, or the like. Similar to the chamber body 102, the closure 108 is fabricated from a material suitable for maintaining a low pressure environment within the launch and recovery volume 110, such as metallic materials like aluminum, titanium, stainless steel, and other metal alloys.

In one embodiment, the closure 108 is a knife gate valve or a slide gate valve having a frame 107 and a gate blade 118. The frame 107 and the gate blade 118 are shaped to correspond with the shape of the chamber body 102. For example, if the chamber body 102 is cylindrical, the frame 107 may be annular and the gate blade 118 substantially circular. In another example, if the chamber body 102 is rectangular, the frame 107 and the gate blade 118 may be substantially quadrate. In one embodiment, the frame 108 has one or more gate seats 109 through which the gate blade 118 is actuated. When in a closed position 112, the gate blade 118 is configured to seal the launch and recovery volume 110 from an external environment, for example the interior of the liquid storage tank. In one embodiment, the closure 108 includes a gate blade actuator (not shown), such as an external hand-wheel threaded onto a screw attached to the gate blade 118. When the hand-wheel is rotated, the screw is axially moved by the wheel, causing the gate blade 118 to be moved in a first or second direction.

The closure 108 is coupled to a tank adapter 114 on a side thereof opposite the chamber body 102. The tank adapter 114 facilitates coupling of the launching system 100 to an opening of the liquid storage tank, such as a manway or hatchway of the liquid storage tank. The tank adapter 114 is fabricated from a material suitable for maintaining a low pressure environment therein, such as metallic materials like aluminum, titanium, stainless steel, and other metal alloys. In one embodiment, the tank adapter 114 adapts the dimensions of the chamber body 102 and/or closure 108 to dimensions and morphologies of the liquid storage tank opening. For example, the tank adapter 114 adapts the diameter of the chamber body 102 adjacent the closure 108 to a diameter of the liquid storage tank opening. In one embodiment, the tank adapter 114 has an inner diameter lesser than an inner diameter of the chamber body 102 and/or an inner diameter of the closure 108 to account for manways or hatchways having smaller dimensions. Furthermore, the tank adapter 114 may have a lower annular surface 115 wide enough to adapt the launching system 100 to liquid storage tank openings having both narrower and wider diameters or widths, such as openings ranging in diameter/width between about 18 inches and about 36 inches, such as between about 24 inches and about 30 inches.

In one embodiment, the tank adapter 114 has a bolt pattern that matches a bolt pattern of the liquid storage tank opening, enabling direct bolting of the launching system 100 to the liquid storage tank. In another embodiment, the tank adapter 114 is clamped to the opening of the liquid storage tank by an external clamping system or device, such as a quick-latch system (not shown). For example, the tank adapter 114 is clamped to the opening of the liquid storage tank by a pull-action latch or toggle clamp, such as a U-hook type clamp, a J-hook type clamp, or the like. The utilization of a quick-latch system enables quick and efficient coupling of the launching system 100 to the liquid storage tank opening. The lower annular surface 115 of the tank adapter 114 may further include one or more grooves 117 for placement of one or more seals therein (not shown), thus enabling the creation of a hermetic seal between the launching system 100 and the storage tank during coupling. For example, the lower annular surface 115 of the tank adapter 114 may include one or more annular grooves 117 therein configured to support one or more o-rings (not shown). The one or more seals may be formed any suitable sealing materials, including but not limited to FFKM, PTFE, PEEK. Additionally or alternatively to the grooves 117, the tank adapter 114 may be configured to be coupled to a gasket disposed between the tank adapter 114 and an opening of the liquid storage tank during operation of the launching system 100.

The tank adapter 114 includes one or more release ports 132 and one or more injection ports 134. The release ports 132 may include a vent port, a test port, a pressure relief port, and/or the like. In one embodiment, one or more gauges, such as a temperature gauge and a pressure gauge, may be coupled to the release ports 132. In one embodiment, the one or more release ports 132 include a pressure relief port substantially similar to the pressure relief port 122 described above. The injection ports 134 may include a foam injection port, an inert gas injection port, and/or the like. In one embodiment, the one or more injection ports 134 include an inert gas injection port substantially similar to the inert gas injection port 126. Altogether, the release ports 132 and the injection ports 134 may be utilized to assess, monitor, and control the conditions of a storage tank vapor gap (e.g. intermediate volume 478 in FIG. 4D) prior to opening of the closure 108 and launch or recovery of the remote inspection device 150.

Figure 2:
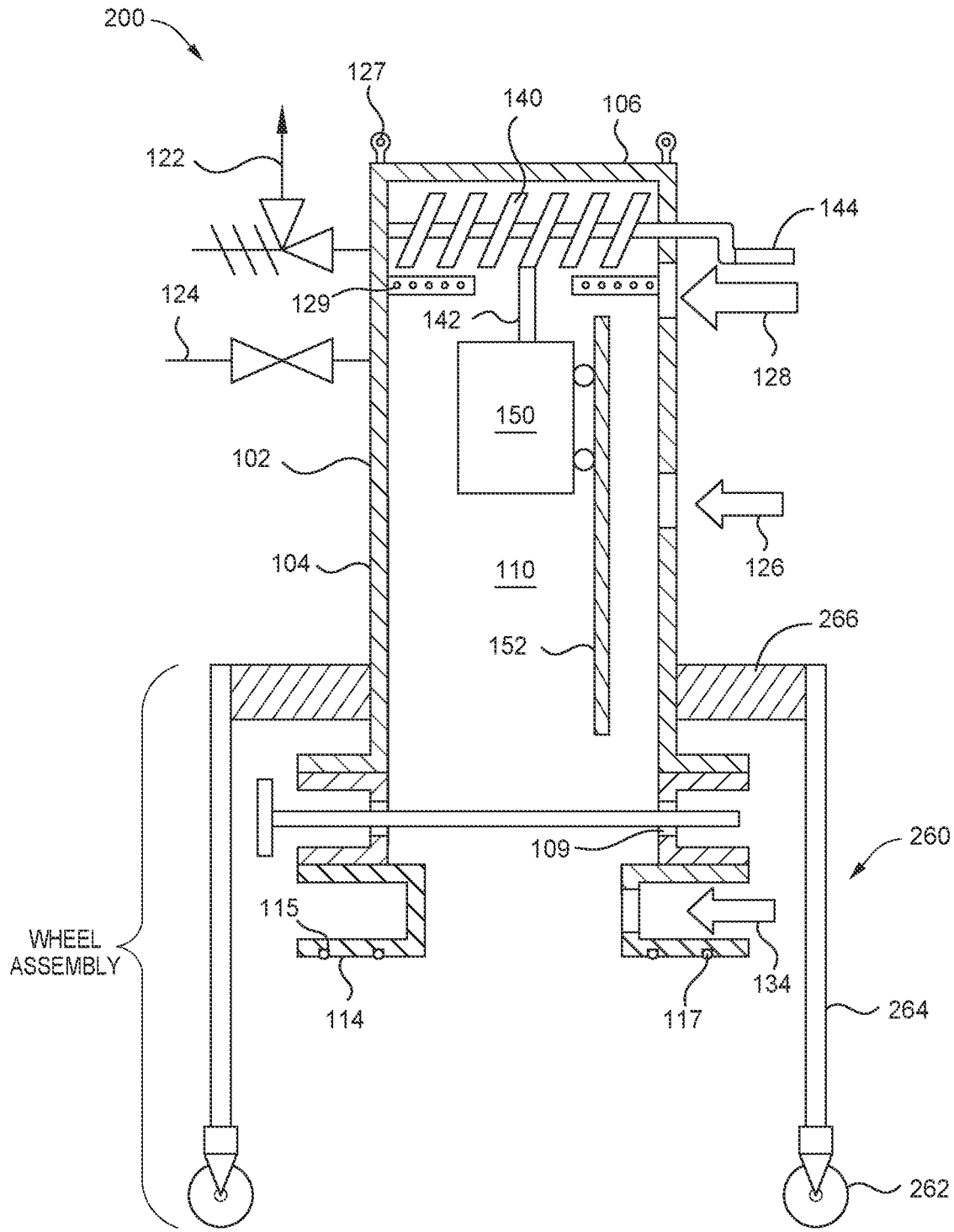
FIG. 2 is a cross-sectional view of a launching system for a remote inspection device according to an embodiment described herein.

FIG. 2 is a cross-sectional view of a launching system 200 configured to launch and recover the remote inspection device 150 according to one embodiment. The launching system 200 is substantially similar to the launching system 100 and includes all the features described with reference to FIG. 1, but further includes a transport system 260 coupled thereto. Accordingly, only the transport system 260 will be described with reference to FIG. 2.

The transport system 260 is configured to facilitate both vertical and horizontal transport of the launching system 200 along a roof of the liquid storage tank, thus enabling quick and efficient coupling of the launching system 200 to the opening of the liquid storage tank for engagement therewith. In one embodiment, the transport system 260 is removably (or fixedly) coupled to the chamber body 102 of the launching system 200 at an end thereof adjacent to the closure 108 and tank adapter 114. The transport system 260 may include three or more wheel assemblies 262 and wheel mounts 264 to facilitate horizontal movement thereof. In such examples, the wheel mounts 264 may be directly or indirectly coupled to the chamber body 102. In one embodiment, the transport system 260 includes a transport frame 266 for coupling the wheel mounts 264 to the chamber body 102. For example, the transport frame 266 may include an annular frame coupled to and substantially surrounding a circumference of the chamber body 102. In one embodiment, the wheel mounts 264 are attached to the transport frame 266 using pivoting arms and ball joints (not shown), thereby providing more freedom for placement of the wheel assemblies 262 relative to the transport frame 266 in case of obstructions around the opening of the liquid storage tank, such as rolling ladders.

The wheel assemblies 262 may generally include a wheel, a wheel frame, and a brake. For example, in one embodiment, the wheel assemblies 262 include a caster, such as a swivel caster or a ball caster. In such embodiments, the wheel assemblies 262 facilitate 360° directional horizontal movement of the launching system 200. The wheel assemblies 262, the wheel mounts 264, and the transport frame 266 are fabricated from any suitable materials capable of withstanding a load capacity of the launching system 200 and the remote inspection device 150. For example, the wheel mounts 264 and the transport frame 266 are fabricated from metallic materials such as aluminum, titanium, stainless steel, and other metallic alloys. In one embodiment, the wheels are pneumatic or foam-filled wheels configured to withstand the load capacities described above, in addition to shock loads from impacts caused by uneven surfaces of the liquid storage tank. Accordingly, the wheels may absorb the impact shock and cushion the launching system 200 during transport thereof.

The transport system 260 further includes a vertical actuator to facilitate vertical movement of the launching system 200, thus enabling lowering and/or raising of the launching system 200 to/from the opening of the liquid storage tank. In one embodiment, the vertical actuator is a mechanical actuator, a hydraulic actuator, a pneumatic actuator, or the like. For example, the vertical actuator may be a mechanical actuator configured to convert rotary motion of a hand-wheel or handle into linear vertical displacement of the launching system 200, such as a jack screw, a house jack, or the like.

Figure 3:
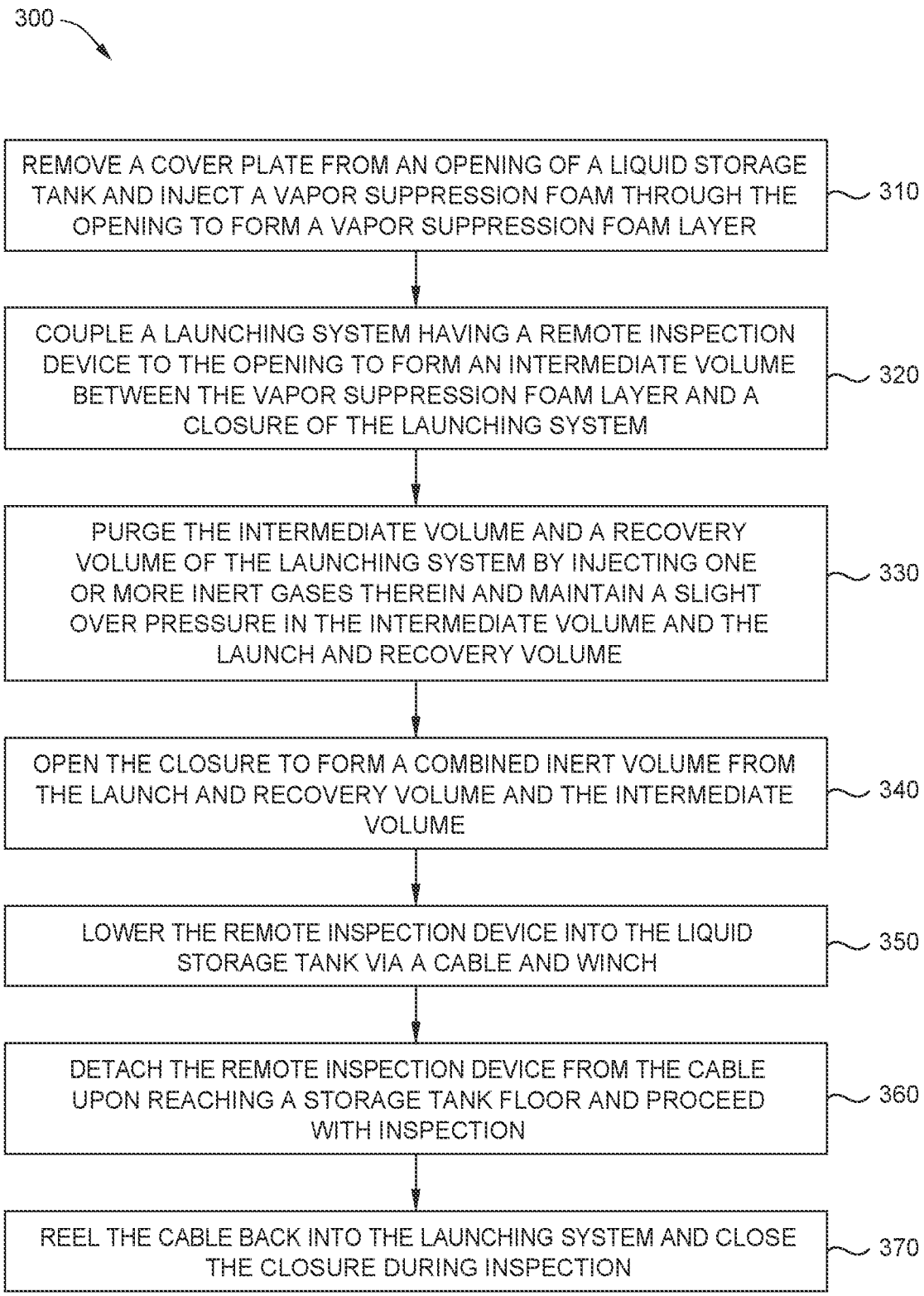
FIG. 3 is a flow diagram of a process of launching a remote inspection device with the launching system of FIG. 1.

FIG. 3 illustrates a flow diagram of a representative method 300 of launching a remote inspection device, such as the remote inspection device 150, with the launching systems 100, 200 of FIG. 1 and FIG. 2. FIGS. 4A-4H illustrate schematic, cross-sectional views of the launching system 100 at different stages of the method 300. Thus, reference to FIGS. 4A-4H will be included in the discussion of FIG. 3 and the method 300 where warranted. Although FIGS. 4A-4H depict the launching system 100, it should be understood that the method 300 may be performed utilizing the launching system 200 as well.

The method 300 for launching the remote inspection device 150 has multiple operations. The operations can be carried out in any suitable order or simultaneously (except where the context excludes the possibility), and the method can include one or more other operations which are carried out before any of the defined operations, between two of the defined operations, or after all of the defined operations (except where the context excludes the possibility). Not all embodiments include all the operations described.

In general, the method 300 includes controlling the volatilization of a stored liquid mass in a liquid storage tank by injecting a layer of vapor suppressing foam thereon at operation 310. At operation 320, an inerted launching system, such as the launching system 100, is coupled to and sealed against an opening of the liquid storage tank. An inert gas is then supplied to a space above the liquid mass in the liquid storage tank at operation 330. At operation 340, a valve integrated with the launching system, such as the closure 108, is opened, thus exposing an internal volume of the launching system to the vapor space. At operation 350, a remote inspection device disposed within the launching system, such as the remote inspection device 150, is transferred into the liquid storage tank via a winch and cable. Upon reaching a bottom surface of the liquid storage tank, the remote inspection device detaches itself from the cable at operation 360. At operation 370, the cable is rewound into the launching system and the closure is closed.

In one embodiment, the method 300 begins with operation 310, corresponding to FIGS. 4A and 4B. At operation 310, a cover plate 462 is removed from an opening 464 of a liquid storage tank 400 containing a liquid mass 466. The liquid storage tank 400 may be any suitable type of storage tank for the storage of liquids, including but not limited to fixed roof tanks, external floating roof tanks, internal floating roof tanks, spherical tanks, bullet tanks, and the like. Examples of liquids 466 stored in the liquid storage tank 400 may include crude oil, gasoline, naphtha, diesel, kerosene, fuel oil, other petroleum combustibles and distillates, and the like. The opening 464 may be any suitable opening in the liquid storage tank 400, such as a manway, manhole, or other type of opening.

After removal of the cover plate 462, vapors accumulated in a vapor space 468 of the liquid storage tank 400 are released into an external environment 482. Thus, a vapor suppression foam 470 may be immediately injected through the opening 464 to form a layer of the vapor suppression foam 470 atop the liquid mass 466. By completely covering the liquid mass 466 with the layer of vapor suppression foam 470, any further volatilization and release of vapors from the liquid mass 466 into the external environment is suppressed or prevented.

In one embodiment, the vapor suppression foam 470 is a firefighting foam, such as a class B foam designed to contain explosive vapors produced by flammable liquids. In one example, the vapor suppression foam 470 is a synthetic foam, such as an aqueous film forming foam (AFFF) or an alcohol-resistant aqueous film-forming foam (AR-AFFF). In another example, the vapor suppression foam 470 is a protein based foam, such as a regular protein foam (P), a fluoroprotein foam (FP), a film-forming fluoroprotein foam (FFFP), an alcohol-resistant fluoroprotein foam (AR-FP), or an alcohol-resistant film-forming fluoroprotein foam (AR-FFFP). The vapor suppression foam 470 is injected into the vapor space 468 via a foam delivery system 472. In one embodiment, the foam delivery system 472 is a handheld compressed air foam system.

At operation 320, the launching system 100 is coupled to the liquid storage tank 400, depicted in FIGS. 4C and 4D. The coupling of the launching system 100 and the opening 464 forms an intermediate volume 478 between the layer of vapor suppression foam 470 or liquid mass 466 and the closure 108. In one embodiment, the launching system 100 is lowered onto the opening 464 by a crane or other suitable lifting device (not shown) attached to one or more lifting lugs coupled to the chamber body 102. In an alternative embodiment, the launching system 100 is lowered onto the opening 464 by adjusting the vertical actuator of the transport system 260 to a desired height after the launching system 100 has already been hoisted unto a roof of the liquid storage tank 400 and transported thereacross to the opening 464.

Once the launching system 100 is aligned with the opening 464, the tank adapter 114 is bolted or clamped to a flange 465 of the opening 464 using a latching mechanism 469. In one embodiment, a gasket 467 is installed on the flange 465 prior to coupling with the tank adapter 114, thus enabling a hermetic seal between the opening 464 and the launching system 100. The gasket 467 may be formed of any suitable sealing materials, including but not limited to FFKM, PTFE, PEEK. Alternatively, the lower annular surface 115 of the tank adapter 114 may include grooves 117 already having one or more seals disposed therein, such as o-rings, thus eliminating the need for utilizing the gasket 467.

At operation 330, the launch and recovery volume 110 and the intermediate volume 478 are purged and inerted by removing and displacing gases therein with an inert gas. For example, the initially-present gases may be displaced by an inert gas such as nitrogen, argon, and the like. In one embodiment, the inert gas is injected into the launch and recovery volume 110 through the inert gas injection port 126, while the initially-present gas species of the launch and recovery volume 110 are purged through the pressure relief port 122. Similarly, the inert gas is injected into the intermediate volume 478 through the one or more injection ports 134, while the initially-present gas species of the intermediate volume 478 are removed through the one or more release ports 132. An active, slight over-pressurization is then maintained in both the intermediate volume 478 and the launch and recovery volume 110, such as a pressure less than 1 psi.

At operation 340, the closure 108 is opened, thus desegregating the launch and recovery volume 110 and the intermediate volume 478 and forming a combined inert volume 480 between the launching system 100 and the liquid mass 466, as depicted in FIG. 4E. Desegregation of the launch and recovery volume 110 and the intermediate volume 478 equalizes the physical conditions, such as temperature and pressure, therebetween. In one embodiment, the closure 108 is opened by manually sliding the gate blade 118 out from the one or more gate seats 109. In another embodiment, the gate blade 118 is actuated by operating a gate blade actuator, such as by rotating a hand-wheel.

After opening the closure 108, the remote inspection device 150 is transferred into the liquid storage tank 400 at operation 350, depicted in FIG. 4F. In one embodiment, the remote inspection device 150 is lowered through the combined inert volume 480 and into the liquid mass 466 by rotating the handle 144 of the winch 140 and unwinding the cable 142. In another embodiment, the winch 140 is operated via an electronic controller to wind and unwind the cable 142, thus raising and lowering the remote inspection device 150 through the combined inert volume 480. In some embodiments, the remote inspection device 150 is moved along one or more sets of guides 152 as it is transferred through the combined inert volume 480. The one or more sets of device guides 152 help stabilize the remote inspection device 150 as it is raised and lowered through the chamber body 102, preventing swinging thereof and collisions of the remote inspection device 150 against the sidewalls 104. Within the liquid mass 466, a negative buoyancy of the remote inspection device 150 enables it to sink to a storage tank floor 401 under its own weight as the cable 142 is unwound.

In one embodiment, the remote inspection device 150 automatically powers on as it is lowered into the liquid storage tank 400. For example, the remote inspection device 150 is automatically activated and/or inactivated as it reaches a desired preset depth in the liquid mass 466 during launch and recovery. In such an embodiment, the remote inspection device 150 includes one or more mechanical pressure switches integrated into a power interlock system (not shown) therein. The utilization of the mechanical pressure switches enables the activation and/or inactivation of the remote inspection device 150 without application of power, thus preventing ignitions. Further, the mechanical pressure switches ensure that the remote inspection device 150 is only powered on when submerged a desired depth below the surface of the liquid mass 466, thus facilitating activation of the remote inspection device 150 in an environment having a reduced oxygen content.

Figure 4G:
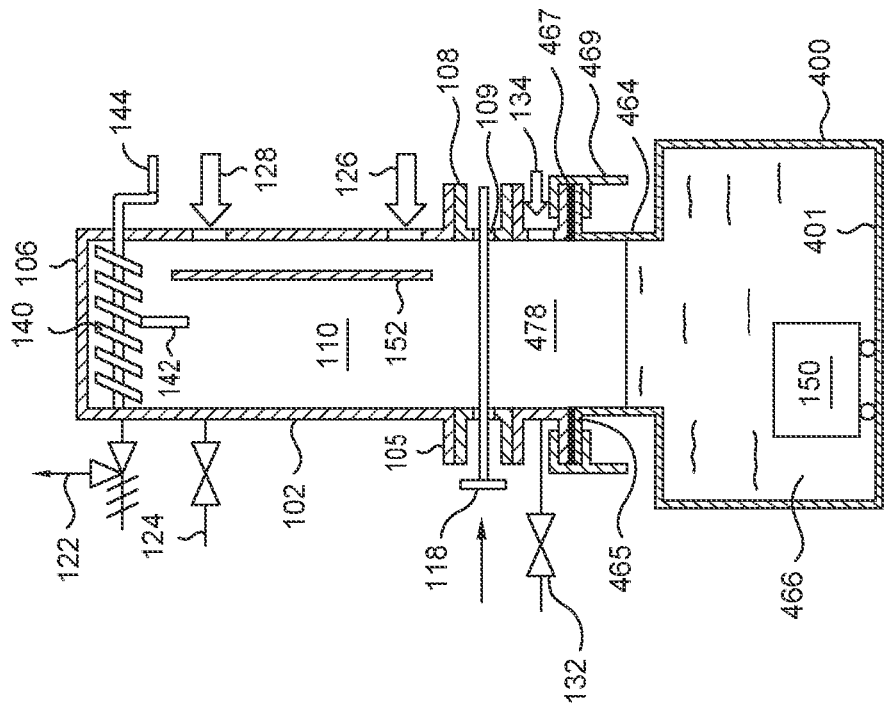
Figure 4H:
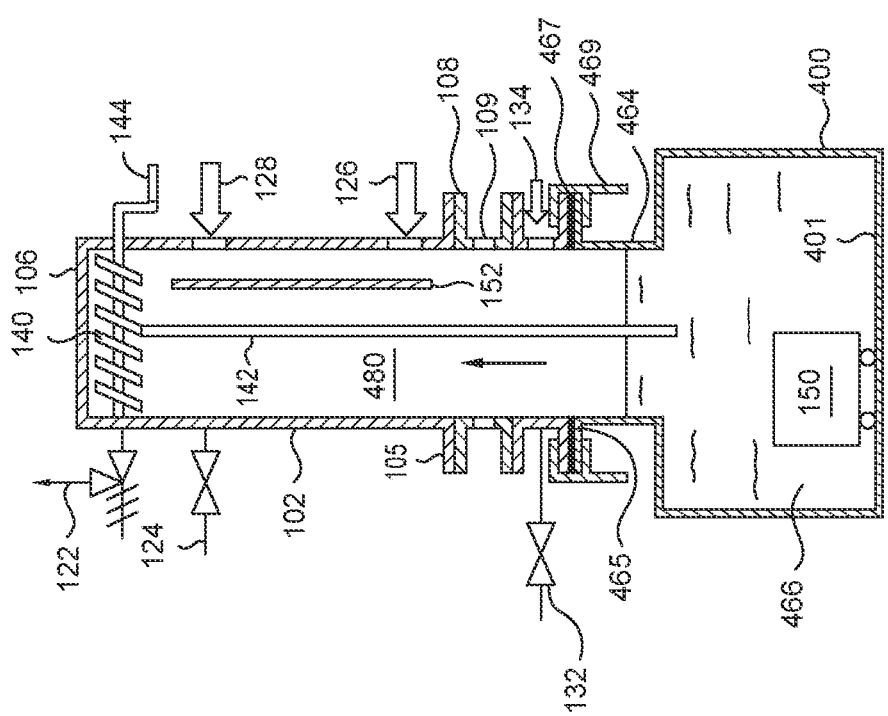

At operation 360 and depicted in FIG. 4G, the remote inspection device 150 detaches from the cable 142 upon reaching the storage tank floor 401. The remote inspection device 150 may then proceed with inspection of the liquid storage tank 400 as the cable 142 is reeled back into the chamber body 102. At operation 370 and depicted in FIG. 4H, the closure 108 is closed after the cable 142 has been reeled back in the chamber body 102.

Figure 5:
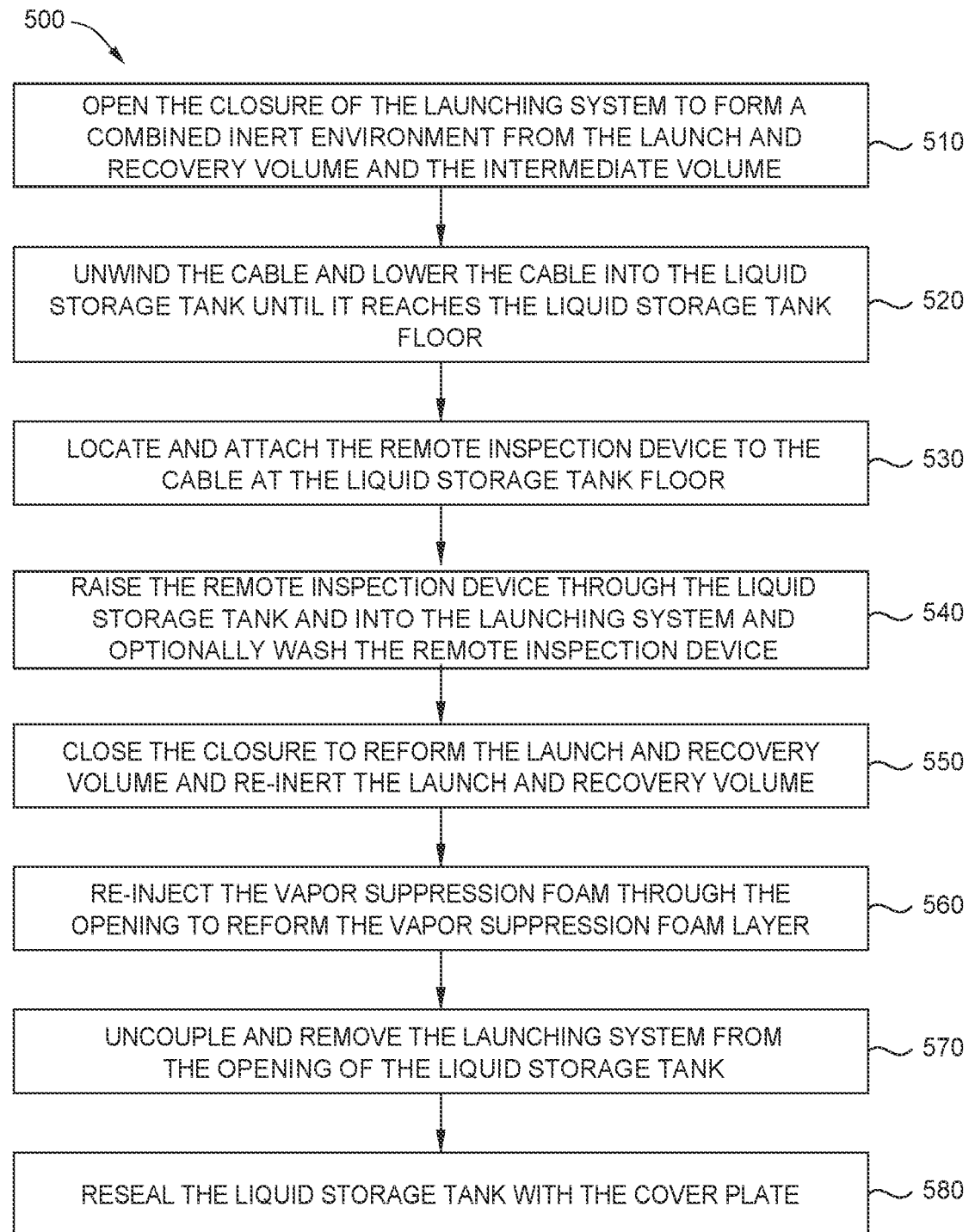
FIG. 5 is a flow diagram of a process of recovering a remote inspection device with the launching system of FIG. 1.

FIG. 5 illustrates a flow diagram of a representative method 500 of recovering a remote inspection device, such as the remote inspection device 150, with the launching systems 100, 200 of FIG. 1 and FIG. 2. FIGS. 6A-6H illustrate schematic, cross-sectional views of the launching system 100 at different stages of the method 500. Thus, reference to FIGS. 6A-6H will be included in the discussion of FIG. 5 and the method 500 where warranted. Although FIGS. 6A-6H depict the launching system 100, it should be understood that the method 500 may be performed utilizing the launching system 200 as well.

Similar to the method 300, the method 500 for recovery of the remote inspection device 150 has multiple operations. The operations can be carried out in any suitable order or simultaneously (except where the context excludes the possibility), and the method can include one or more other operations which are carried out before any of the defined operations, between two of the defined operations, or after all of the defined operations (except where the context excludes the possibility). Not all embodiments include all the operations described.

In general, the method 500 includes opening the closure of the launching system at operation 510 and lowering the cable into the liquid storage tank at operation 520. At operation 530, the remote inspection device already deployed in the liquid storage tank latches onto the cable at the liquid storage tank floor. The remote inspection device is then hoisted through the liquid storage tank and into the launching system at operation 540. At operations 550 and 560, the closure is closed, the internal volume of the launching system is re-inerted, and the liquid mass within the liquid storage tank is re-coated with the vapor suppression foam. The launching system is then removed from the liquid storage tank at operation 570 and the liquid storage tank is sealed at operation 580.

In one embodiment, the method 500 begins with operation 510, corresponding to FIG. 6A. At operation 510, the closure 108 is opened, thus once again combining the launch and recovery volume 110 and the intermediate volume 478 to form the combined inert volume 480, depicted in FIG. 6B. Opening of the closure 108 equalizes the physical conditions between the launch and recovery volume 110 and the intermediate volume 478, such as temperature and pressure. Similar to embodiments described above, the closure 108 may be opened by manually sliding the gate blade 118 out from the one or more gate seats 109. In another embodiment, the gate blade 118 may be actuated by operating a gate blade actuator, such as a hand-wheel.

Optionally, prior to opening of the closure 108, the launch and recovery volume 110 and/or the intermediate volume 478 may be re-inerted. For example, the launch and recovery volume 110 and the intermediate volume 478 are purged and re-inerted by removing and displacing gases therein with an inert gas. In one embodiment, the inert gas is injected into the launch and recovery volume 110 through the inert gas injection port 126, while the previously present gas species of the launch and recovery volume 110 are purged through the pressure relief port 122. Similarly, the inert gas is injected into the intermediate volume 478 through the one or more injection ports 134, while the previously present gas species of the intermediate volume 478 are removed through the one or more release ports 132.

As depicted in FIG. 6B, after opening of the closure 108, the cable 142 is unwound from the winch 140 at operation 520 and lowered into the liquid storage tank 400 until an end of the cable 142 reaches the storage tank floor 401. In one embodiment, the cable 142 is unwound by manually rotating the handle 144 of the winch 140. In another embodiment, the cable is unwound by operation of a pneumatic or hydraulic controller coupled to the winch 140.

Figure 6C:
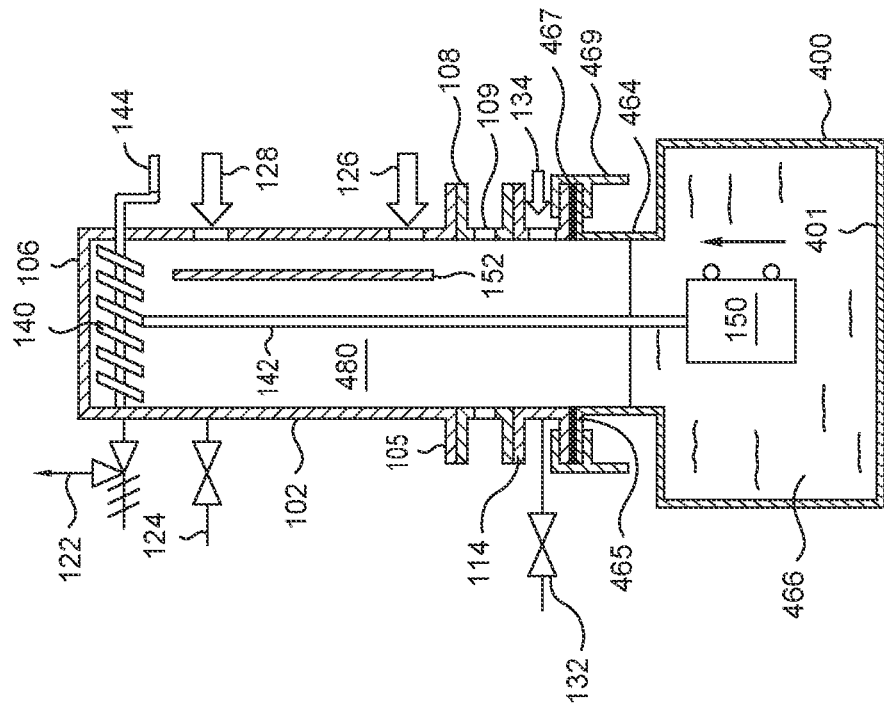
Figure 6D:
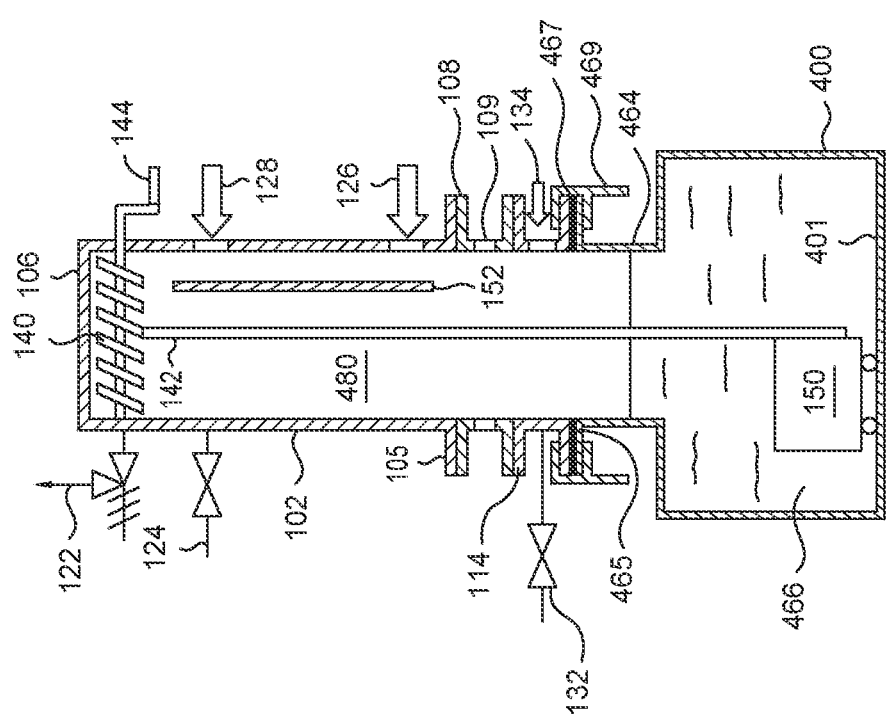

At operation 530 and corresponding FIG. 6C, the remote inspection device 150 locates the cable 142 at the storage tank floor 40 and attaches itself thereto. After attachment of the remote inspection device 150 to the cable 142, the remote inspection device 150 is hoisted through the liquid storage tank 400 and into the chamber body 102 of the launching system 100 at operation 540, as depicted in FIG. 6D. As described above, the remote inspection device 150 is hoisted through the liquid storage tank 400 and the chamber body 102 by winding of the cable 142. At a desired preset depth of the liquid mass 466, the remote inspection device 150 may automatically power off by operation of one or more mechanical pressure switches integrated therein. Upon exiting the liquid storage tank 400 and entering the chamber body 102, the remote inspection device 150 may be coupled to the one or more sets of device guides 152 to position and usher the remote inspection device 150 to a final storage position within the launching system 100. For example, the remote inspection device 150 may be guided along one or more sets of tracks longitudinally disposed within the chamber body 102 as it is hoisted through the combined inert volume 480.

Optionally at operation 540, prior to closing the closure 108 at operation 550, one or more cleaning fluids may be supplied to the launch and recovery volume 110 by the wash port 128. For example, the wash port 128 and the spray device 129 may be utilized to wash the remote inspection device 150, the cable 142, the interior walls of the chamber body 102, and other components or equipment within the launch and recovery volume 110. In one embodiment, the cleaning fluids may be supplied to the launch and recovery volume 110 as the remote inspection device 150 is raised therethrough, thus washing the cable 142 and the remote inspection device 150 as it is recovered from the liquid mass 466. In another embodiment, the cleaning fluids are supplied to the launch and recovery volume 110 after the remote inspection device 150 has been recovered and is secured within the launching system 100.

Figure 6E:
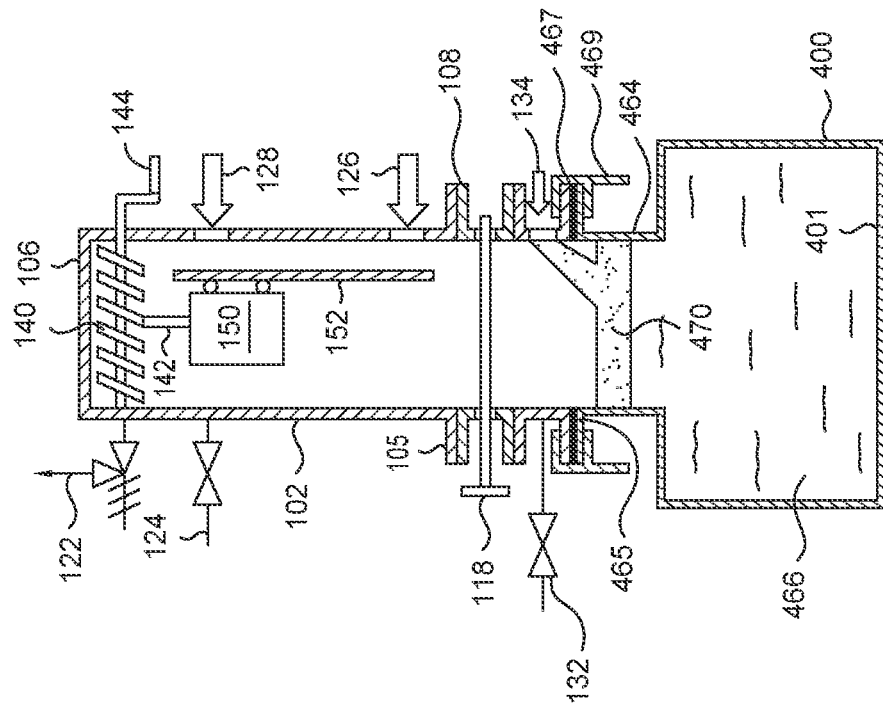
Figure 6F:
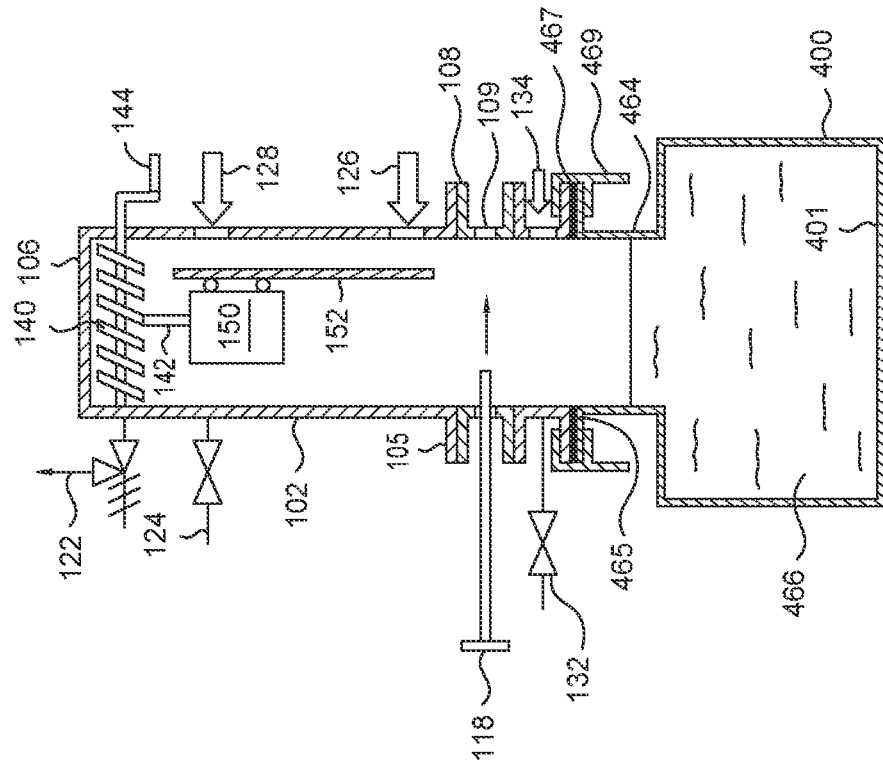

At operation 550 and depicted in FIG. 6E, the closure 108 is closed. As described above, the closure 108 may be closed by manually sliding the gate blade 118 into the one or more gate seats 109 of the frame 107. In another embodiment, the gate blade 118 may be actuated by operating a gate blade actuator, such as a hand-wheel. Closing of the closure 108 results in the reformation of the launch and recovery volume 110 within which the remote inspection device 150 is stored. At this point, the launch and recovery volume 110 is re-inerted, as described above with reference to operations 330 and 510.

Upon removal of the remote inspection device 150 from the liquid mass 466, the vapor suppression foam 470 may be re-injected into the opening 464 at operation 560 to reform the layer of vapor suppression foam 470 atop the liquid mass 466. Thus, any further volatilization and release of vapors form the liquid mass 466 is suppressed prior to removal of the launching system 100 from the opening 464. In one embodiment, the vapor suppression foam 470 is injected into the opening 464 through a foam injection port 134 disposed through the tank adapter 114.

Figure 6H:
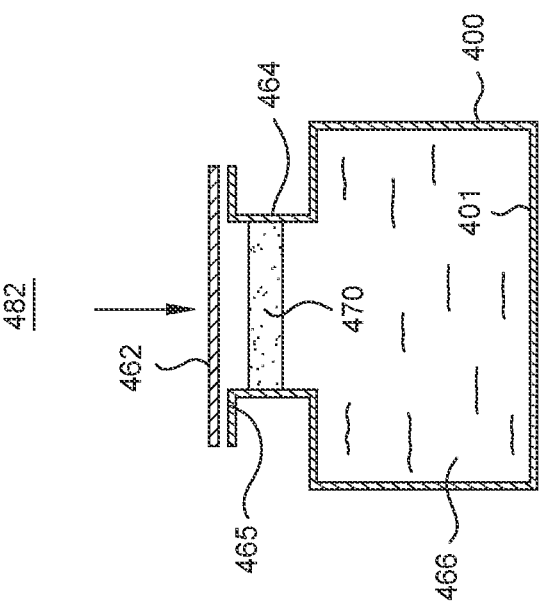
Figure 6G:
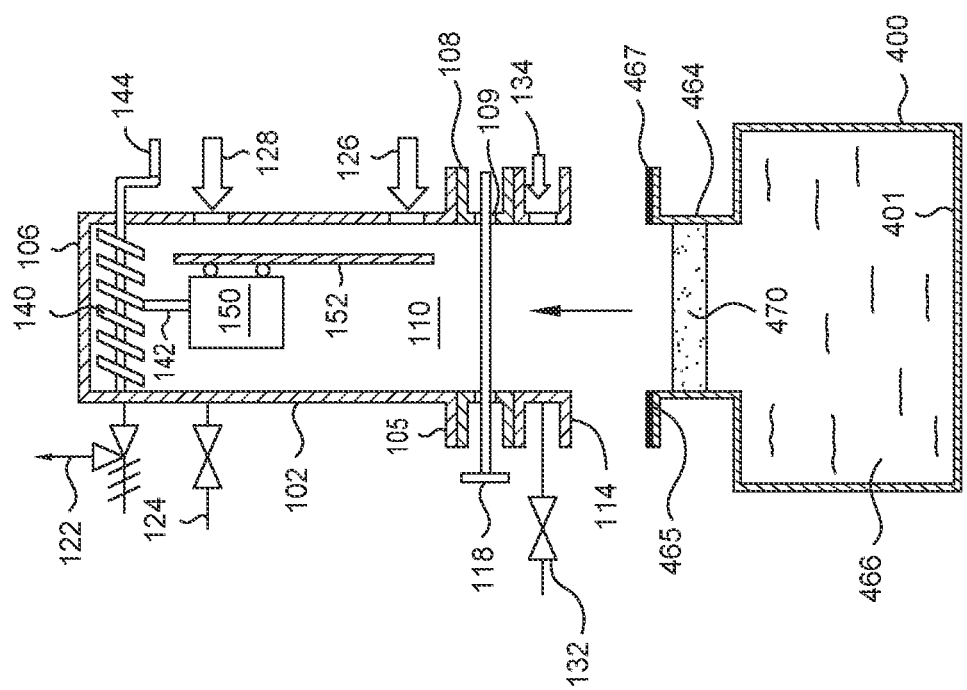

At operation 570 and corresponding FIG. 6G, the launching system 100 is uncoupled and removed from the opening 464 of the liquid storage tank 400. The launching system 100 is uncoupled from the opening 464 by removing or releasing a latching mechanism 469 connecting the tank adapter 114 to the flange 465. In one embodiment, the latching mechanism 469 includes one or more bolts disposed through the tank adapter 114 and the flange 465. In another embodiment, the latching mechanism 469 includes a clamp connecting the tank adapter 114 and the flange 465. Upon removal or release of the latching mechanism 469, the launching system 100 is removed from the opening 464. In one embodiment, the launching system 100 is raised from the opening 464 by a crane or other suitable lifting device (not shown) attached to one or more lifting lugs thereof. In an alternative embodiment, the launching system 100 is raised away from the opening 464 by adjusting the transport system 260 to a desired height. As depicted in FIG. 6H, once the launching system 100 is removed from the opening 464, the cover plate 462 is resealed against the opening 464 at operation 580.

It is contemplated that one or more aspects disclosed herein may be utilized to deploy a remote inspection device within a liquid storage tank, such as a hydrocarbon storage tank, containing a hazardous environment therein. The application of the above-described aspects enables thorough inspection of hydrocarbon storage tanks in a safe and efficient manner while liquid product is stored therein. In one aspect, hazardous vapors within a hydrocarbon storage tank are contained within the tank by utilization of a vapor suppression foam and an inerted remote inspection device launching system. The utilization of the vapor suppression foam and the inerted launching system prevents the escape of volatile and hazardous vapors from releasing into the surrounding environment during storage tank inspection. In further aspects, the remote inspection device launched into the storage tank is configured to activate in an environment with low oxygen content and without the application of external power, thus preventing ignition. Accordingly, the aspects described herein prevent the exposure of nearby personnel to hazards normally associated with hydrocarbon storage facilities.

Although the systems and processes described herein have been described in detail, it should be understood that various changes, substitutions, and alterations can be made without departing from the spirit and scope of the disclosure as defined by the following claims. Those skilled in the art may be able to study the preferred embodiments and identify other ways to practice the claimed subject matter that are not exactly as described herein. It is the intent of the inventors that variations and equivalents of the disclosure are within the scope of the claimed subject matter while the descriptions, abstract, and drawings are not used to limit the scope of the claimed subject matter.

While the foregoing is directed to embodiments of the present disclosure, other and further embodiments of the disclosure may be devised without departing from the basic scope thereof, and the scope thereof is determined by the claims that follow.

What is claimed is:

1. A method for deploying an inspection device into a vessel containing a fluid therein, comprising:
    disposing a vapor suppression layer on the fluid within the vessel;
    displacing a first gas within an internal volume of a launching system with a first inert gas, the internal volume disposed within a closable chamber of the launching system;
    transitioning the closable chamber of the launching system from a closed position to an open position; and
    passing the inspection device from the launching system into the fluid within the vessel.

2. The method of claim 1, wherein the first inert gas comprises at least one of nitrogen, argon, or carbon dioxide.

3. The method of claim 2, wherein transitioning the closable chamber and passing the inspection device from the launching system into the fluid further comprises:
    displacing a second gas within an intermediate volume of the vessel with a second inert gas, the intermediate volume disposed between the closable chamber and a top surface of the fluid;
    opening a closure of the closable chamber disposed between the internal volume and the intermediate volume; and
    lowering the inspection device through the internal volume and the intermediate volume, the inspection device lowered by unwinding a cable coupled to a winch disposed within the internal volume, the cable removably coupled to the inspection device at a distal end thereof.

4. The method of claim 3, wherein the first inert gas and the second inert gas comprise a same type of gas.

5. The method of claim 4, wherein a slight overpressure above ambient atmospheric pressure is maintained within the internal volume and the intermediate volume prior to opening the closure.

6. The method of claim 1, further comprising:
    passing the inspection device from the fluid into the launching system; and
    transitioning the closable chamber from the open position to the closed position.

7. The method of claim 6, further comprising:
    supplying a cleaning fluid to the internal volume of the closable chamber to wash the inspection device as the inspection device is passed from the fluid into the launching system.

8. The method of claim 1, further comprising:
    prior to transitioning the closable chamber of the launching system from the closed position to the open position, attaching the closable chamber to an access passage of the vessel while in the closed position.

9. A method for deploying an inspection device into a vessel containing a liquid, comprising:
    disposing a vapor suppression layer on the liquid within the vessel, the vapor suppression layer comprising a vapor suppression foam;
    displacing a first gas within an internal volume of a launching system with a first inert gas, the internal volume disposed within a closable chamber of the launching system and comprising the inspection device disposed therein;
    opening the closable chamber of the launching system to an access passage of the vessel; and
    passing the inspection device from the closable chamber into the liquid within the vessel.

10. The method of claim 9, wherein the first inert gas comprises at least one of nitrogen, argon, or carbon dioxide.

11. The method of claim 10, wherein opening the closable chamber and passing the inspection device from the launching system into the liquid further comprises:
    displacing a second gas within an intermediate volume of the vessel with a second inert gas, the intermediate volume disposed between the closable chamber and a top surface of the liquid;
    opening a closure of the closable chamber disposed between the internal volume and the intermediate volume; and
    lowering the inspection device through the internal volume and the intermediate volume, the inspection device lowered by unwinding a cable coupled to a winch disposed within the internal volume, the cable removably coupled to the inspection device at a distal end thereof.

12. The method of claim 11, wherein a slight overpressure above ambient atmospheric pressure is maintained within the internal volume and the intermediate volume prior to opening the closure.

13. The method of claim 9, further comprising:
    passing the inspection device from the liquid into the launching system;
    closing the closable chamber to the access passage; and
    removing the closable chamber of the launching system from the access passage.

14. The method of claim 13, further comprising:
supplying a cleaning fluid to the internal volume of the closable chamber to wash the inspection device as the inspection device is passed from the liquid into the launching system.

15. A method for deploying an inspection device into a vessel containing a vaporizable liquid, comprising:
disposing a vapor suppression layer on the vaporizable liquid within the vessel, the vapor suppression layer comprising a vapor suppression foam;
displacing a first gas within an internal volume of a launching system, the internal volume disposed within a closable chamber of the launching system and comprising the inspection device disposed therein, the first gas displaced with an inert gas;
displacing a second gas within an intermediate volume disposed between the closable chamber and a top surface of the liquid, the second gas displaced with the inert gas;
opening the closable chamber of the launching system to an access passage of the vessel; and
passing the inspection device from the closable chamber into the liquid within in the vessel.

16. The method of claim 15, wherein the inert gas comprises at least one of nitrogen, argon, or carbon dioxide.

17. The method of claim 15, wherein the vapor suppression foam comprises at least one of an aqueous film forming foam, an alcohol-resistant aqueous film-forming foam, a regular protein foam, a fluoroprotein foam, a film-forming fluoroprotein foam, an alcohol-resistant fluoroprotein foam, and an alcohol-resistant film-forming fluoroprotein foam.

18. The method of claim 15, wherein opening the closable chamber and passing the inspection device from the launching system into the liquid further comprises:
opening a closure of the closable chamber disposed between the internal volume and the intermediate volume; and
lowering the inspection device through the internal volume and the intermediate volume, the inspection device lowered by unwinding a cable coupled to a winch disposed within the internal volume, the cable removably coupled to the inspection device at a distal end thereof.

19. The method of claim 18, wherein a slight overpressure above ambient atmospheric pressure is maintained within the internal volume and the intermediate volume prior to opening the closure.

20. The method of claim 15, further comprising:
passing the inspection device from the liquid into the launching system;
supplying a cleaning fluid to the internal volume of the closable chamber to wash the inspection device as the inspection device is passed from the liquid into the launching system;
closing the closable chamber to the access passage; and
removing the closable chamber of the launching system from the access passage.

* * * * *